US006698945B2

(12) United States Patent
Omori

(10) Patent No.: US 6,698,945 B2
(45) Date of Patent: Mar. 2, 2004

(54) AUTOMATIC PHOTO FILM FEEDING APPARATUS

(75) Inventor: Hisashi Omori, Wakayama (JP)

(73) Assignee: Noritsu Koki Co., Ltd., Wakayama-ken (JP)

( * ) Notice: Subject to any disclaimer, the term of this patent is extended or adjusted under 35 U.S.C. 154(b) by 39 days.

(21) Appl. No.: 10/226,726

(22) Filed: Aug. 22, 2002

(65) Prior Publication Data

US 2003/0039476 A1 Feb. 27, 2003

(30) Foreign Application Priority Data

Aug. 24, 2001 (JP) ....................................... 2001-254410
Aug. 24, 2001 (JP) ....................................... 2001-254411

(51) Int. Cl.[7] .................................................. F03D 3/08
(52) U.S. Cl. ....................... 396/612; 396/599; 396/615; 396/620; 396/622
(58) Field of Search ................................ 396/567–570, 396/598, 599, 612, 613, 615, 617, 620, 647; 355/27–29, 40, 41, 72, 75

(56) References Cited

U.S. PATENT DOCUMENTS 5,311,237 A 5/1994 Kawada et al.
5,541,699 A * 7/1996 Yamaguchi ................. 396/620
5,640,639 A 6/1997 Pagano et al.
5,708,905 A 1/1998 Zangenfeind et al.
5,796,465 A * 8/1998 Arimoto et al. .............. 355/27
6,030,131 A * 2/2000 Shimamura et al. ........ 396/599

FOREIGN PATENT DOCUMENTS

EP 0 790 527 A1 8/1997
JP 5-113626 7/1993
JP 6-250369 9/1994

* cited by examiner

*Primary Examiner*—D. Rutledge
(74) *Attorney, Agent, or Firm*—Fulbright & Jaworski L.L.P.

(57) ABSTRACT

An automatic photo film feeding apparatus includes a transport mechanism for successively transporting a plurality of film cartridges to a feed position. Transport mechanism includes a first transport unit for supporting the film cartridges with photo films drawn downward and successively transporting film cartridges substantially horizontally to a transfer position, and a second transport unit for receiving film cartridges transported to the transfer position by the first transport unit, and transporting film cartridges horizontally to the feed position. Second transport unit has a posture change mechanism for changing film cartridges to a posture having photo films drawn from film cartridges being directed substantially horizontally. Feeding apparatus includes a feed mechanism for drawing photo films out of film cartridges transported to the feed position, and feeding photo films to a processing section. Feed mechanism has rollers for substantially horizontally drawing the photo films out of the film cartridges transported to the feed position by the second transport unit.

10 Claims, 11 Drawing Sheets

AUTOMATIC PHOTO FILM FEEDING APPARATUS

BACKGROUND OF THE INVENTION

1. Field of the Invention

This invention relates to an automatic photo film feeding apparatus having a transport mechanism for continuously transporting a plurality of film cartridges to a feeding position, and a feed mechanism for feeding to a processing section photo film from the film cartridges transported to the feeding position by the transport mechanism. More particularly, the invention relates to an apparatus for automatically feeding photo film from film cartridges to a film developing device or the like. The term film cartridges used herein is a collective term meaning containers for storing rolls of image-bearing photo film, including cassettes storing rolls of photo film, and casings storing such cassettes.

2. Description of the Related Art

Automatic photo film feeding apparatus having the above construction are disclosed in Japanese Patent Publications (Unexamined) Nos. 5-113626 and 6-250369, for example. The autoloading apparatus 31 shown in FIG. 4 of the former publication includes a holder 32 for holding a plurality of cartridges 11 storing cassettes 2 therein, and a control mechanism 33 for feeding to a film drawing mechanism 36 one cartridge 11 after another falling by gravity from the lower end of the holder 32. Film 1 in the cartridge 11 set to the film drawing mechanism 36 is drawn from the cassette 2 by transport rollers 38 to be transported to developing tanks. When the film 1 has been drawn from the cassette 2, the cartridge 11 storing this cassette 2 is collected in a collecting pocket 40 by a collecting mechanism 39. The collecting mechanism 39 includes a movable bottom 45 for supporting the cartridge 11 from below, and a solenoid mechanism 39 for swinging the bottom 45 downward. The autoloading apparatus 31 has a priority processing gate 34 disposed at a lower end thereof, for processing a cartridge inserted therein with priority. FIG. 7 shows an autoloading apparatus 51 which is a modification of the autoloading apparatus 31.

Next, the film feeding apparatus shown in the latter publication has an endless chain 3 driven to circulate horizontally, and a plurality of supporting blocks 2 arranged equidistantly along the entire length of endless chain 3. Each supporting block receives a cassette 16 with a film 17 drawn out downward. As the endless chain 3 is driven, the cassettes 16 are transported one after another to a film input 10. In the film input 10 film 17 is drawn from the cassettes 16 and transported toward a developing station 18. The cassettes 16 empty of film 17 are guided by an apron unit 9 to a collecting section not shown.

To consider the prior examples noted above, the former apparatus feeds the cartridges 11 to the film drawing mechanism 36 by using the weight of cartridges 11. This feeding mode is less reliable than a forcible transport using drive. Moreover, to make effective use of gravity, the autoloading apparatus 31 and 51 must have increased vertical dimensions, and hence a disadvantage of the entire apparatus tending to be large.

Next, the latter apparatus, while the cassette 16 are transported reliably, the film input 10 is constructed to draw film 17 downward and therefore a transport system must be disposed in a downward position to transport the film 17 drawn downward by the film input 10. This results in a disadvantage that the apparatus has increased vertical dimensions in this part. Assuming where the latter film feeding apparatus is provided for a film developing apparatus, as described in the embodiment, it is considered rational to employ a construction in which a developing section is disposed below the feeding apparatus so that the photo film drawn out is directly fed into the developing section below. However, to secure space for accommodating a drive system of the film feeding apparatus and for transporting empty cassettes after photo film is drawn out, the entire film developing apparatus tends to be vertically enlarged. In this sense, there is room for improvement.

SUMMARY OF THE INVENTION

The object of this invention is to provide an apparatus constructed as small as possible for reliably transporting film cartridges and feeding photo film from the film cartridges.

The above object is filmed, according to this invention, by an automatic photo film feeding apparatus as defined in claim 1. The apparatus comprises a transport mechanism for successively transporting a plurality of film cartridges to a feed position, the transport mechanism including a first transport unit for supporting the film cartridges with photo films drawn downward and successively transporting the film cartridges substantially horizontally to a transfer position, and a second transport unit for receiving the film cartridges transported to the transfer position by the first transport unit, and transporting the film cartridges horizontally to the feed position; the second transport unit having a posture change mechanism for changing the film cartridges to a posture having the photo films drawn from the film cartridges being directed substantially horizontally; and a feed mechanism for drawing the photo films out of the film cartridges transported to the feed position, and feeding the photo films to a processing section, the feed mechanism having rollers for substantially horizontally drawing the photo films out of the film cartridges transported to the feed position by the second transport unit.

In the automatic photo film feeding apparatus having the above features, the film cartridges are transported substantially horizontally by the first transport unit to reach the transfer position. Next, the film cartridges are transported one by one to the feed position by the second transport unit while being changed to a posture having the photo films drawn from the film cartridges being directed substantially horizontally. In the feed position, the photo film is drawn out by the rollers of the feed mechanism. That is, the posture of the film cartridges is changed while transporting the film cartridges substantially horizontally with the photo films drawn out beforehand, and finally the photo films are fed substantially horizontally. Consequently, compared with a construction for transporting the film cartridges downward, this apparatus may have reduced vertical dimensions. Where, for example, a developing device is provided, a downwardly opening space may be secured with ease. As a result, the apparatus according to this invention is constructed as small as possible for reliably transporting the film cartridges and feeding the photo films from the film cartridges.

The above apparatus may have the following specific construction. The first transport unit includes an endless rotating belt wound around wheels juxtaposed sideways, and a plurality of support members arranged on the rotating belt for supporting the film cartridges, and the second transport unit has a handling member for receiving the film cartridges one by one, the handling member being movable between the transfer position and the feed position, and between the transfer position and a discharge position spaced from the first transport unit, and a control device is provided for transferring the film cartridges supported by the support members to the handling member in the transfer position based on movement of the endless rotating belt of the first transport unit, moving the handling member supporting one of the film cartridges to the feed position, returning the handling member to the transfer position after drawing out the photo film in the feed position, further moving the handling member from the transfer position to the discharge position, causing the handling member to discharge the one of the film cartridges, and allowing the one of the film cartridges to fall by gravity.

In the automatic photo film feeding apparatus having the above features, the film cartridges, after having the photo films drawn out in the feed position, are returned to the transfer position. This operating mode is employed to use the transport path of the second transport unit also as part of a discharge path for the empty film cartridges. After the handling member is moved from the transfer position to the discharge position for discharging each film cartridge, the handling member has only to return to the transfer position for receiving a next film cartridge from the first transport unit. As a result, based on the rational transport of the film cartridges, the photo films may be fed successively.

The handling member may define a space opening toward the first transport unit for receiving the film cartridges from the first transport unit, and a fixed contact rod may be provided for contacting the one of the film cartridges supported by the handling member and separating the one of the film cartridges from the handling member when the handling member is moved to the discharge position.

In the automatic photo film feeding apparatus having the above features, the film cartridge with the photo film having been drawn out is reliably discharged from the handling member by the fixed contact rod.

Further, the apparatus may have the following specific construction. The handling member is rotatable about a horizontal axis, the posture change mechanism having a cam mechanism for rotating the handling member about the axis when the handling member is moved from the transfer position to the feed position.

In the automatic photo film feeding apparatus having the above features, when a film cartridge transferred to the handling member in the transfer position is transported to the feed position, the film cartridge undergoes a change in posture by being rotated with the handling member about the axis by action of cam mechanism. Thus, the apparatus has a simple construction without requiring an additional actuator for rotating the handling member.

The foregoing object is fulfilled, according to another aspect of this invention, by an automatic photo film feeding apparatus as defined in claim 5. This apparatus comprises a transport mechanism for successively transporting a plurality of film cartridges to a feed position, the transport mechanism supporting the film cartridges with photo films drawn downward and successively transporting the film cartridges to the feed position while changing the film cartridges to a posture having the photo films drawn from the film cartridges being directed substantially horizontally; a feed mechanism for drawing the photo films out of the film cartridges transported to the feed position; and an interrupting feed mechanism for transporting to the feed position a further film cartridge provided from outside separately from the film cartridges supported by the transport mechanism, the interrupting feed mechanism having a film cartridge supporting holder switchable between an introducing position for placing the further film cartridge in the feed position, and a retracted position separated from the introducing position.

In the automatic photo film feeding apparatus having the above features, once the operator sets the film cartridges to a posture having the photo films drawn out downward beforehand, the film cartridges are horizontally transported one by one to the feed position while being changed to the posture having the photo films drawn from the film cartridges being directed substantially horizontally. Thus, the film cartridges are transported reliably, and there is no need to secure a space below. Compared with the construction for transporting the film cartridges downward, this apparatus may have reduced vertical dimensions with relative ease. Further, by moving the holder of the interrupting feed mechanism to the introducing position, the photo film of the film cartridge supported by the holder may be fed directly to a processing section. In this way, the photo film of a particular film cartridge may be processed with priority. As a result, the apparatus according to this invention is constructed compact for reliably transporting the film cartridges and feeding the photo films from the film cartridges. This apparatus is also capable of processing the photo film of a particular film cartridge with priority.

The above apparatus may further comprise an auxiliary feed mechanism juxtaposed with the feed mechanism for receiving a photo film of different width to each photo film receivable by the feed mechanism, the holder of the interrupting feed mechanism being movable to a position opposed to the auxiliary feed mechanism.

With the automatic photo film feeding apparatus having the above features, when processing a photo film of different width to the photo film fed by the feed mechanism, the holder of the interrupting feed mechanism supporting the film cartridge having the photo film of different width may only be set to the position opposed to the auxiliary feed mechanism. Specifically, for example, the feed mechanism may be constructed to feed 135-size film cartridges, while the auxiliary feed mechanism is constructed to feed photo film of 240-size (i.e. APS film or Advanced Photo System Film). With the automatic feeding apparatus having such construction, the holder of the interrupting feed mechanism may be used to support a film cartridge of a 240-size photo film and the holder may be set to the position opposed to the auxiliary feed mechanism, thereby passing the 240-size photo film to the auxiliary feed mechanism. As a result, the apparatus according to the invention has the improved construction forming two photo film feeding paths and having the movable holder to be capable of processing two types of photo film.

Other features and advantages of this invention will be apparent from the following description of the embodiment to be taken with reference to the drawings.

DESCRIPTION OF THE PREFERRED EMBODIMENT

An embodiment of this invention will be described hereinafter with reference to the drawings.

Figure 1:
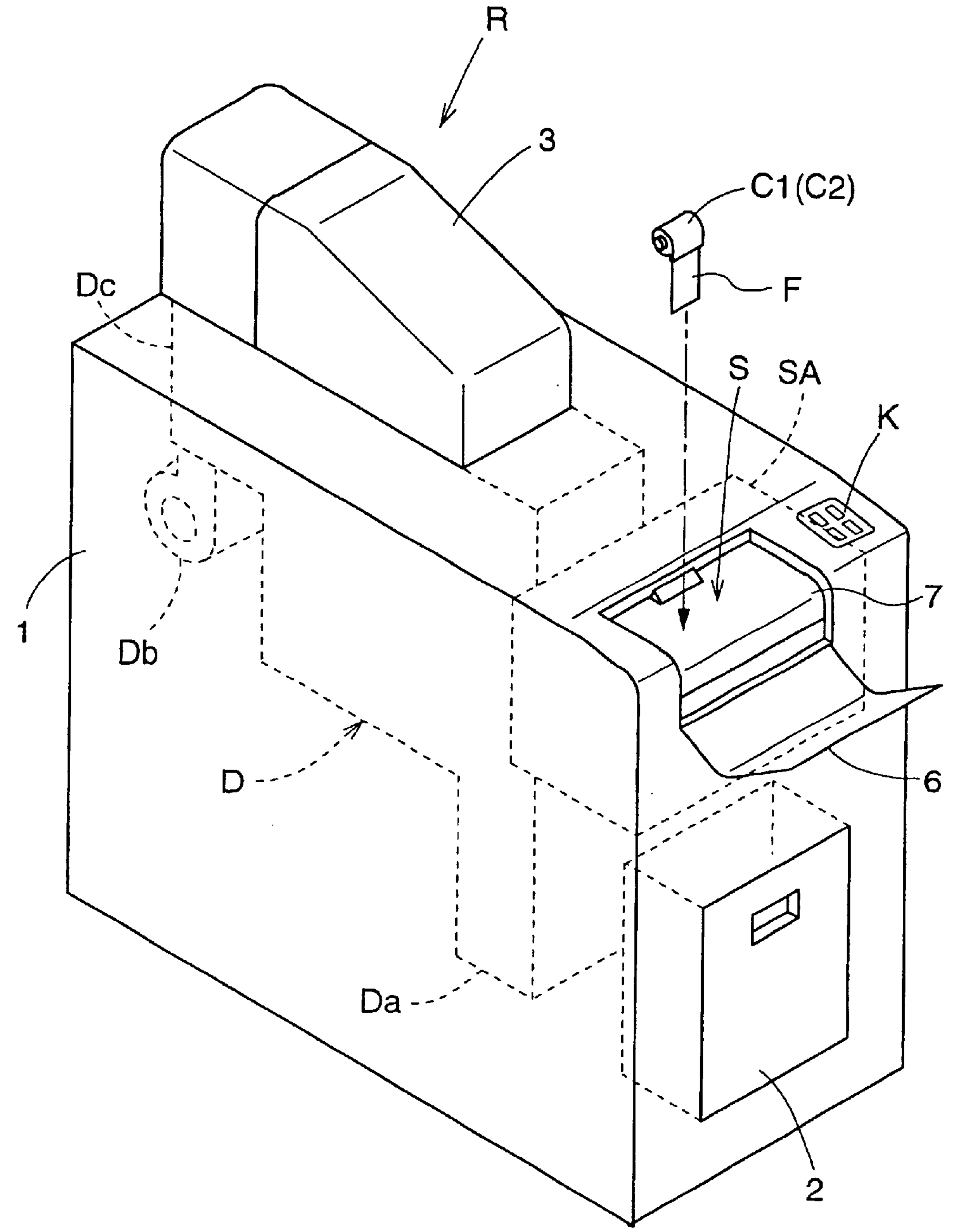
FIG. 1 is a perspective view of a film processor.

FIG. 1 shows a film processor having a generally rectangular parallelepiped case 1. The case 1 houses a developing device D for developing and drying photo film. The case 1 defines, at one end position thereof, a film supplying unit S to which a film cartridge C containing a roll of photo film F to be developed hereinafter called film F for short) may be set as shown in FIG. 1, and a keyboard K operated by the operator.

The case 1 further defines, on an upper surface thereof, a discharge unit R for discharging dry film F processed by the developing device D. The discharge unit R has a discharging space having an openable transparent resin cover 3.

Further, a collecting container 2 is disposed inside a vertical wall at the end of the case 1 for collecting empty film cartridges C from which film F has been drawn at the film supplying unit S. The collecting container 2 has a bottomed space for storing film cartridges C, and may be drawn sideways out of the case 1. The developing device D includes a developing section Da having a plurality of developing tanks such as a color developing tank, a bleaching tank, and a fixing tank, and a drying section Dc for supplying developed film F with warm air from a blower Db.

The term film cartridges C used herein is a collective term meaning containers for storing rolls of photo film to be developed, including cassettes storing rolls of elongate 135-size film F1 or other film, casings storing such cassettes, and dedicated cartridges for receiving 240-size film F2 to be developed.

This film processor has an automatic feeding apparatus SA disposed adjacent the film feeding unit S. When the operator sets a plurality of film cartridges C1 of 135-size originally scheduled to be processed, to the film supplying unit S as shown in FIG. 1, the automatic feeding apparatus SA automatically draws film F1 from one of the film cartridges C1 and feeds the film F1 to the developing device D. Besides this operation, a single film cartridge C (which may be a cartridge C1 of 135-size, or may be a dedicated film cartridge C2 having taken up a 240-size film F2) may be processed with priority over the automatic feeding of the film cartridges C1 of 135-size set to the film supplying station S as originally scheduled to be processed. Then, the automatic feeding apparatus SA performs an interrupt processing by drawing film F from this cartridge C and feeding it to the developing device D.

Figure 3:
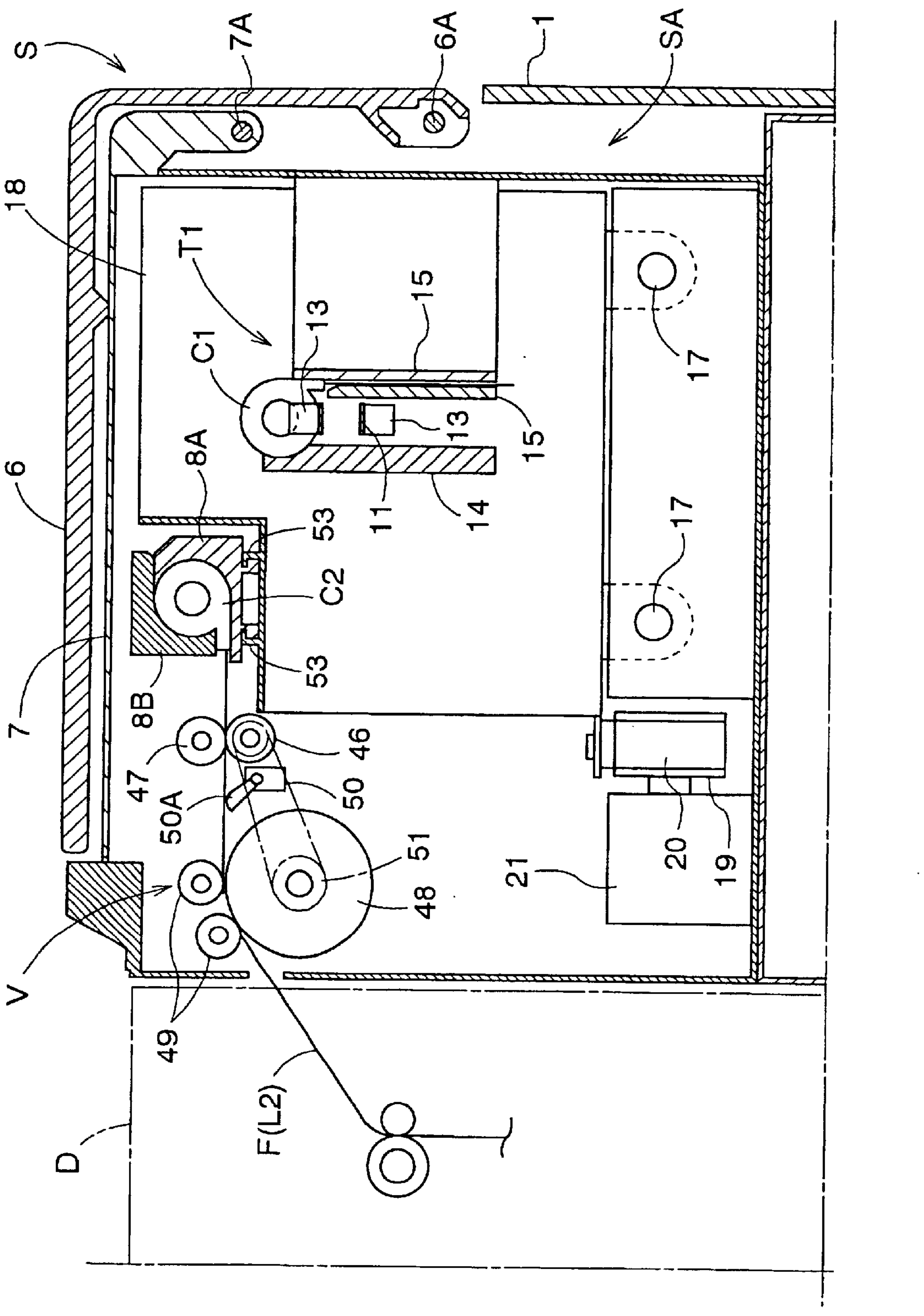
FIG. 3 is a side view in vertical section of the automatic feeding apparatus.

As shown in FIG. 3, the film supplying unit S has a first lid member 6 openable and closeable about a horizontal open/close axis 6A. A second lid member 7 is disposed inwardly of the first lid member 6 to be openable and closeable about an open/close axis 7A parallel to the open/close axis 6A. Only when the first lid member 6 is opened, the second lid member 7 may be accessed and opened. Only after the second lid member 7 is closed, the first lid member 6 may be closed. Thus, the automatic feeding apparatus SA is disposed in a darkroom-like space doubly protected by the first lid member 6 and second lid member 7. The automatic feeding apparatus SA includes a feed mechanism T for processing, one after another, the plurality of film cartridges C1 of 135-size originally scheduled to be processed and set to the film supplying unit S, and feeds film F1 to the developing device D. The feed mechanism T includes a first transport unit T1 for successively supporting and transporting the plurality of cartridge C1 of 135-size film set by the operator, in a horizontal direction X to a transfer position P1, a second transport unit T2 for receiving the film cartridges C1 transported to the transfer position P1 by the first transport unit T1, and transporting the film cartridges C1 in a horizontal direction Y (perpendicular to the direction X in plan view) to a feed position P2, and a main feed mechanism U for drawing films F1 from the film cartridges C1 transported to the feed position P2, and feeding the films F1 to the developing device D. The main feed mechanism U has a first lane L1 for transporting the 135-size films F1 to the developing device D. A second lane L2 is disposed adjacent the first lane L1, and extends parallel to the first lane L1. The second lane L2 provides an auxiliary feed mechanism V for transporting 240-size films F2.

Figure 2:
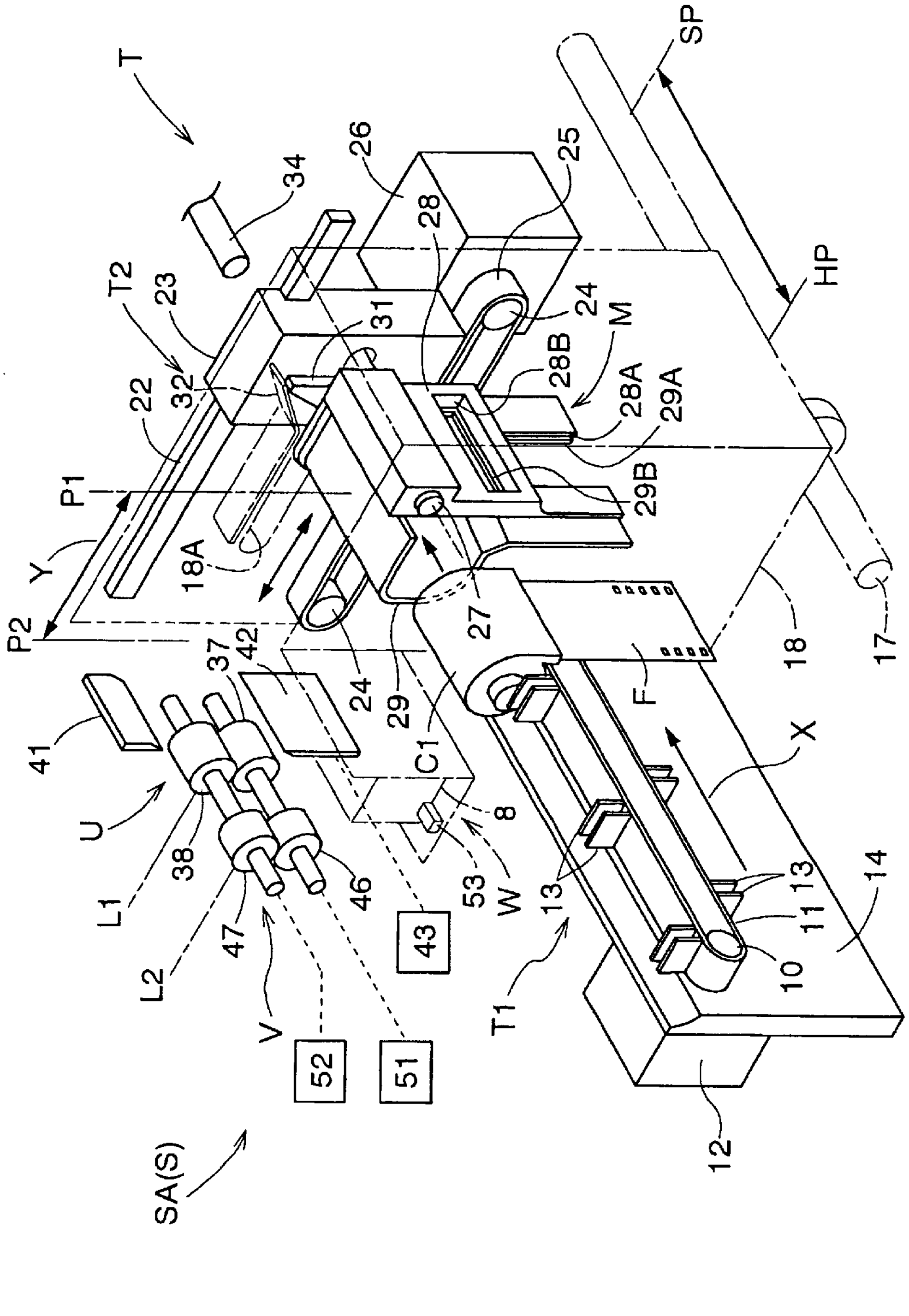
FIG. 2 is a perspective view showing a main construction of an automatic feeding apparatus.
Figure 7:
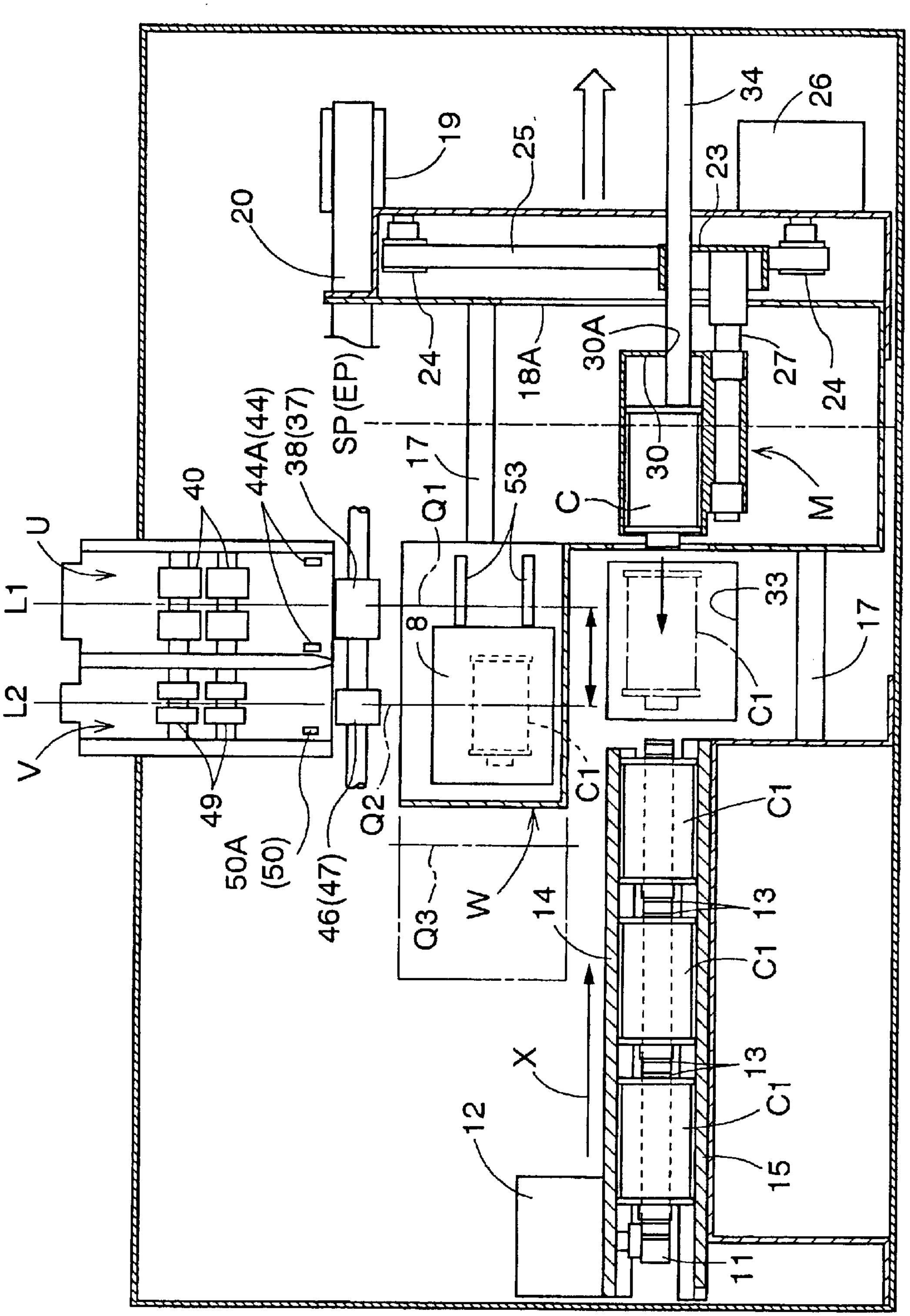
FIG. 7 is a plan view in cross section of the automatic feeding apparatus.

In addition, an interrupting feed mechanism W is provided for processing a single film cartridge C set from outside by the operator, with priority over the film cartridges set to the film supplying station S as originally scheduled. As shown in FIG. 2, the interrupting feed mechanism W has a holder 8 to which the operator may set the film cartridge C from outside (after opening the first lid member 6 and second lid member 7). As shown in FIG. 7, the holder 8 is switchable among a first introducing position Q1 for enabling the films F1 to be fed to the main feed mechanism U for 135-size film, a second introducing position Q2 for enabling the films F2 to be fed to the auxiliary feed mechanism V for 240-size film, and a retracted position Q3 spaced from the two introducing positions. The retracted position Q3 is the home position of the holder 8. The holder 8, when in the home position, does not obstruct movement of a handling member M from the transfer position P1 to the feed position P2. When using the interrupting feed mechanism W, the operator sets a film cartridge to the holder 8 in the home position, moves the holder 8 to the first introducing position Q1 or second introducing position Q2, and doses the first lid member 6 and second lid member 7. Then, an interrupt processing may be started. Upon start of the interrupt processing, the film is fully drawn out of the film cartridge, with the rear end of the film entering the developing device. At this time, a notice is given (e.g. by a green indicator lamp to be described hereinafter) to the effect that the first lid member 6 and second lid member 7 may be opened. The operator may open the first lid member 6 and second lid member 7 to perform a next operation. The next operation may be setting a different interrupting film cartridge to the holder 8, or may be manually moving the holder 8 to the retracted position Q3 and dosing the first lid member 6 and second lid member 7. Once the holder 8 manually moved to the retracted position Q3 and the first lid member 6 and second lid member 7 are dosed, the processing by the automatic feeding apparatus SA is automatically resumed. The developing device D has, arranged parallel to each other, a transport path for transporting the 135-size film F1 loaded from the main feed mechanism U through the first lane L1, and a transport path for transporting the 240-size film F2 loaded from the auxiliary feed mechanism V through the second lane L2. However, the developing device D has a processing mode set thereto in which a developing process is not performed by transporting the 135-size film F1 and 240-size film F2 simultaneously through the two transport paths.

Operation of Automatic Feeding Apparatus SA

When a plurality of film cartridges C1 of 135-size films F1 are set to the first transport unit T1 of automatic feeding apparatus SA, with forward ends of the films F1 drawn out irregular-shaped forward end portions being cut off beforehand) and directed downward from cartridge openings, the first transport unit T1 transports the film cartridges C1 one by one in the horizontal direction X (axially of the film cartridges C1) to the transfer position P1. Next, the second transport unit T2 transports the film cartridges C1 in the horizontal direction Y perpendicular to the direction X. During this transport, the posture of film cartridges C1 is changed before reaching the feed position P2, so that the films F1 drawn from the film cartridges C1 are now directed downstream with respect to the direction of transport (i.e. toward the feed position P2).

In a basic operating mode, when the film cartridges C1 are transported to the feed position P2 by the second transport unit T2, the main feed mechanism U feed the film F1 of each film cartridge C1 to the developing device D. When the feeding of film F1 is completed, the second transport unit T2 returns the empty film cartridge C1 to the transfer position P1, and the film cartridge C1 is dropped to a discharging space formed below the transfer position P1 to be collected in the collecting container 2. The interrupting feed mechanism W enables an interrupt processing with priority over the above basic operating mode. In this interrupt processing, a 135-size film F1 of film cartridge C1 supported by the holder 8 is fed from the main feed mechanism U to the first lane L1, or a 240-size film F2 taken up in the dedicated film cartridge C2 supported by the holder 8 is fed from the auxiliary feed mechanism V to the second lane L2.

Detailed Construction of Automatic Feeding Apparatus SA

As shown in FIG. 2, the first transport unit T1 of automatic feeding apparatus SA includes an endless belt 11 of the timing belt type (one example of rotating belts) extending along the direction X and wound around a pair of pulleys 10 supported to be rotatable about transverse axes, a transport motor 12 for driving the pulleys 10, support members 13 provided on the endless belt 11 (the operator placing each film cartridge C1 in sideways posture in a setting position defined between a pair of support members 13), a cartridge guide 14 for contacting a plurality of film cartridges C1 supported by the support members 13, and guiding the film cartridges C1 in the direction X, and a film guide 15 (FIG. 3) for guiding the films F1 drawn out of the film cartridges C1 in the direction X The film cartridges C1 supported by the support members 13 are transported to the transfer position P1 by the drive of the transport motor 12.

As shown in FIG. 2, the second transport unit T2 in its entirety is supported by a shift frame 18 movable along a pair of guide rods 17 extending in the direction of transporting the film cartridges C1 (direction X) by the first transport unit T1. As shown in FIG. 3, the shift frame 18 has, connected to a lower position thereof, a part of an endless belt 20 of the timing belt type wound around a pair of pulleys 19. Thus, the shift frame 18 is reciprocated in the direction X along the guide rods 17 by the drive of shift motors 21 connected to the pulleys 19. With this reciprocation, as shown in FIG. 2, the shift frame 18 may be selectively placed between home position HP and shift position SP. The shift frame 18 has a guide rail 22 mounted thereon and extending in the direction Y. The guide rail 22 supports a generally rectangular parallelepiped movable frame 23 slidable in the direction Y. The shift frame 18 has a pair of pulleys 24 rotatable about transverse axes, an endless belt 25 of the timing belt type wound around the pulleys 24, and a moving motor 26 for driving the pulleys 24. A part of the endless belt 25 is fixed to the moving frame 23. By operating the moving motor 26, the movable frame 23 may be reciprocated in the direction Y relative to the shift frame 18.

The movable frame 23 has a support shaft 27 projecting from a vertical surface thereof and having an axis extending in the direction X (in horizontal posture). The handling member M is supported on a projecting end region of the support shaft 27 to be rotatable about the axis of support shaft 27 for supporting each film cartridge C1. The shift frame 18 has a slot 18A formed in a vertical wall thereof and extending in the direction Y. The support shaft 27 can reciprocate through the slot 18A without contacting the shift frame 18. When the moving motor 26 is operated with the shift frame 18 placed in the home position HP in FIG. 2, the handling member M may be moved between the transfer position P1 and feed position P2. The position of the handling member M provided by moving the handling member M in the direction Y to the transfer position P1 and then moving the shift frame 18 in the direction X to the shift position SP will be called a discharge position EP.

Figure 6:
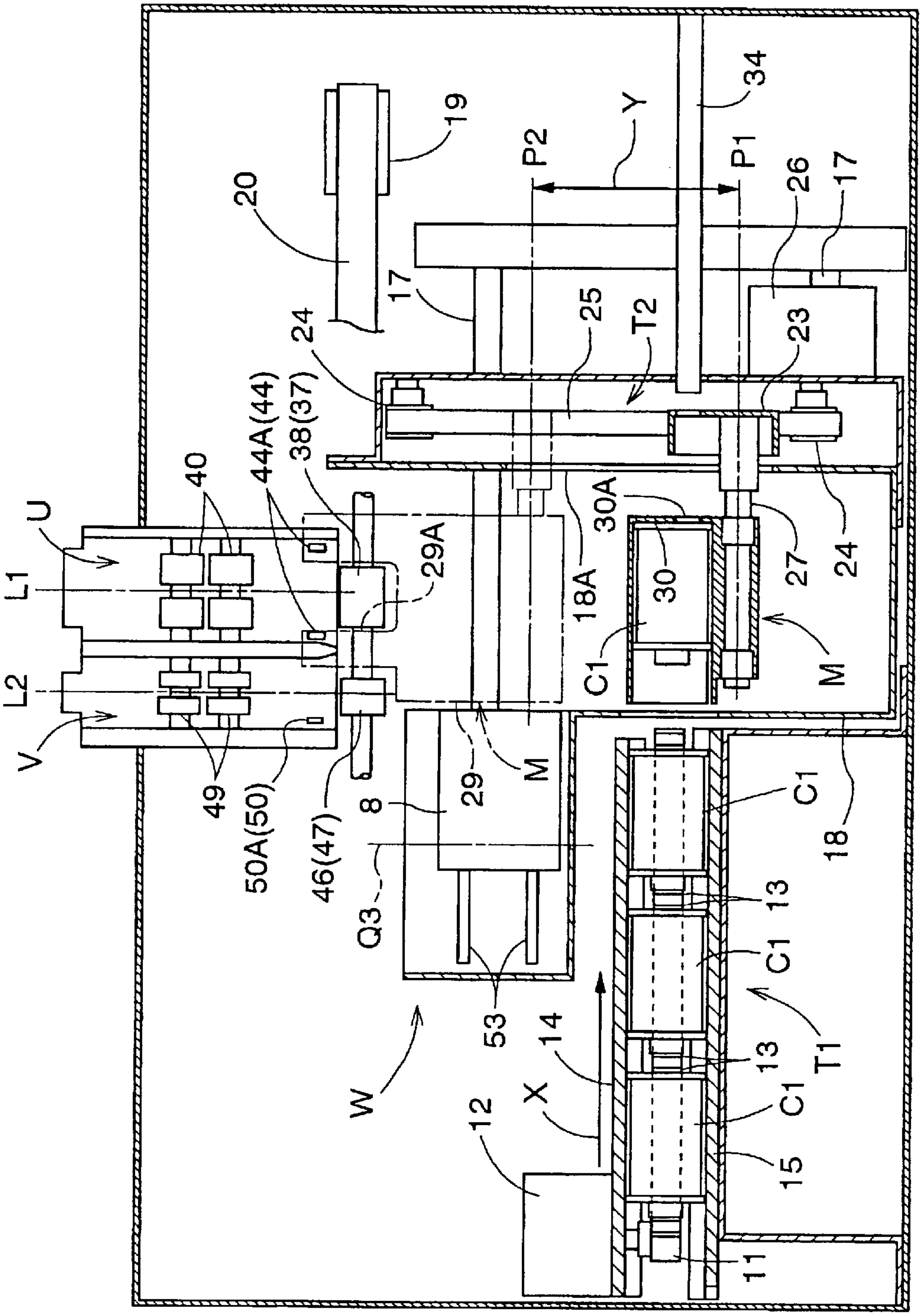
FIG. 6 is a plan view in cross section of the automatic feeding apparatus.

The handling member M has a plate-like base member 28 rotatably supported by the support shaft 27, a holder 29 supported by the base member 28 and curved to define a holding space for a film cartridge C1, and a wall member 30 (FIG. 6) disposed in the holding space adjacent the support shaft. An opening is formed in a position (opposed to the first transport unit T1) where the film cartridge C1 is moved in and out. As shown in FIG. 2, the base member 28 and holder 29 have cutouts 28A and 29A formed in end positions thereof covering the forward end of film F1 drawn out of film cartridge C1, to expose a transversely middle position of the film F1. These cutouts 28A and 29A allow the film F to be pinched by rollers in the feed position P2 as described hereinafter. The base member 28 and holder 29 have cutting openings 28B and 29B formed in proximal regions thereof to facilitate cutting of the film F1 by a cutter unit in the feed position P2 as described hereinafter. In addition, the wall member 30 defines an opening 30A.

Figure 4:
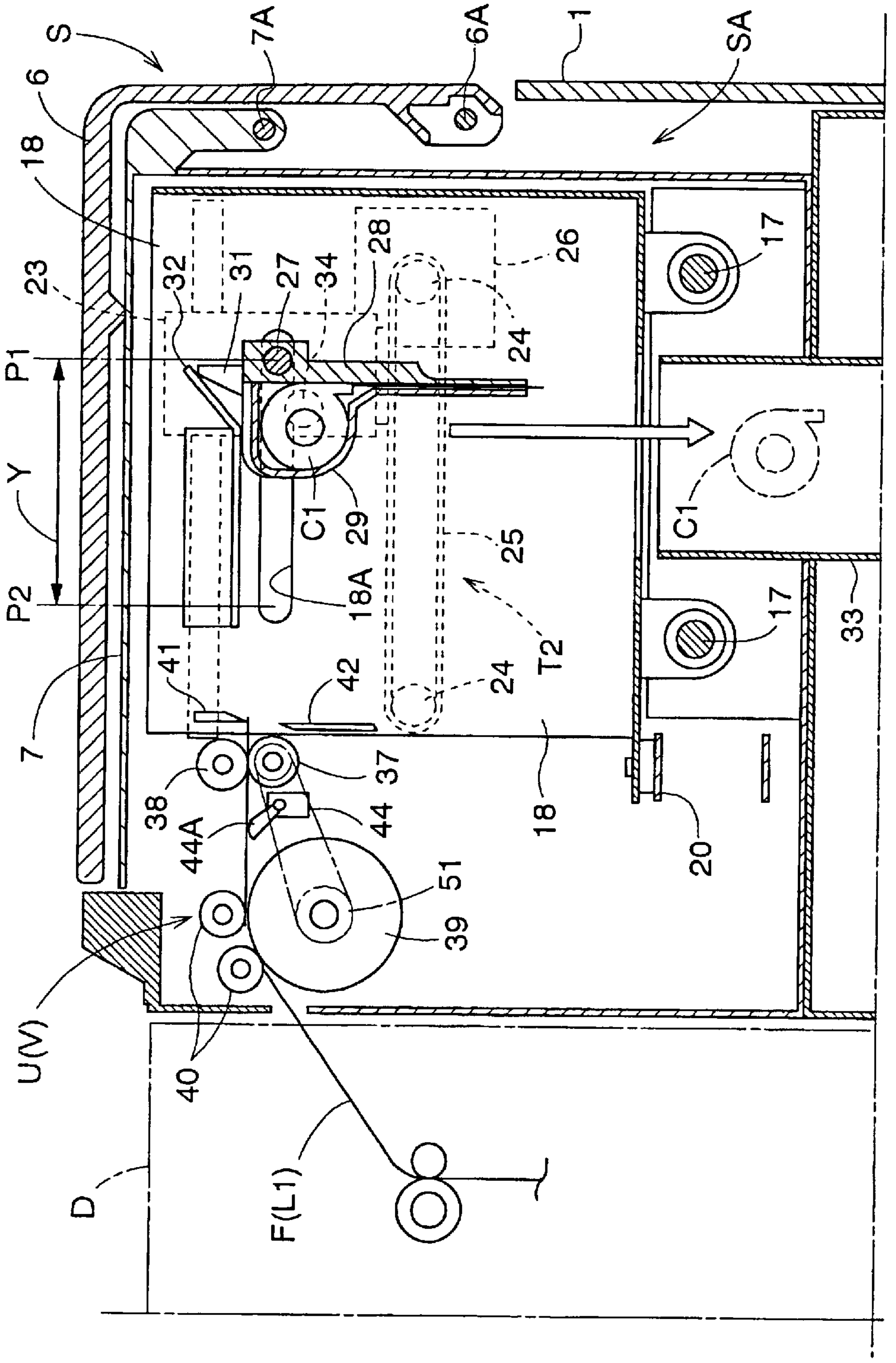
FIG. 4 is a side view in vertical section of the automatic feeding apparatus.
Figure 5:
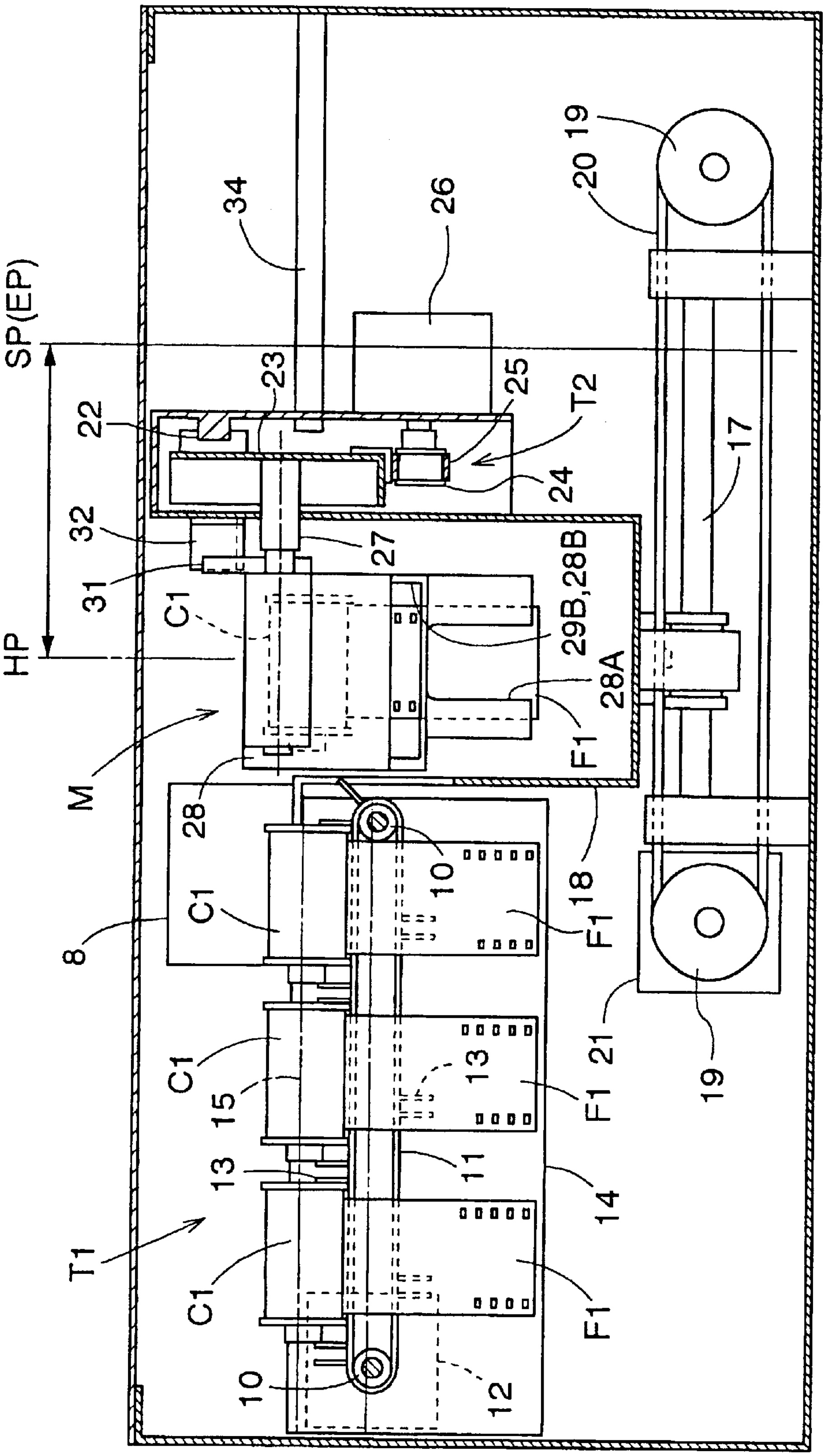
FIG. 5 is a front view in vertical section of the automatic feeding apparatus.
Figure 8A:
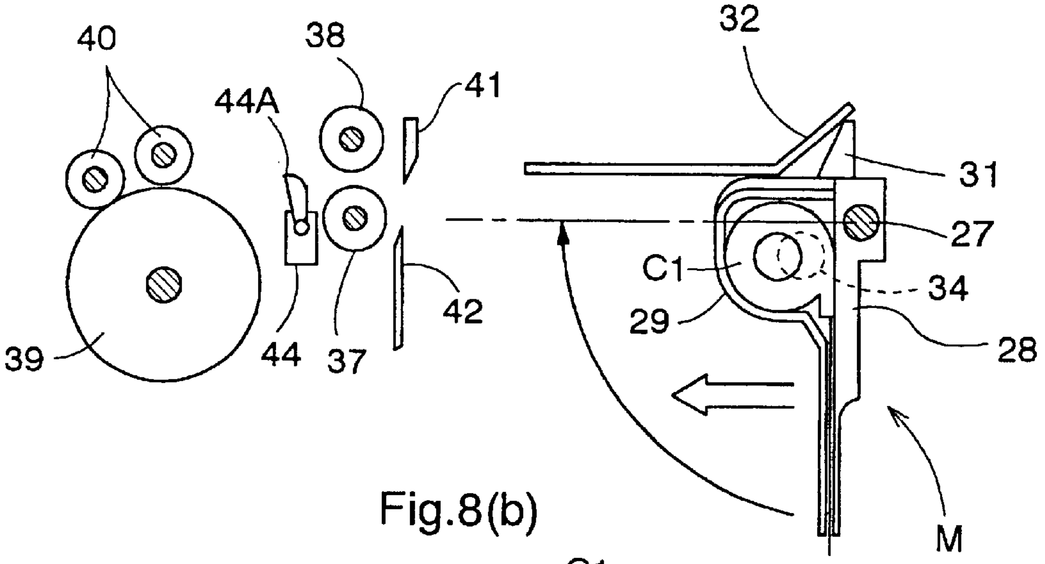
FIG. 8 shows schematic views of a handling member in varied postures.
Figure 8B:
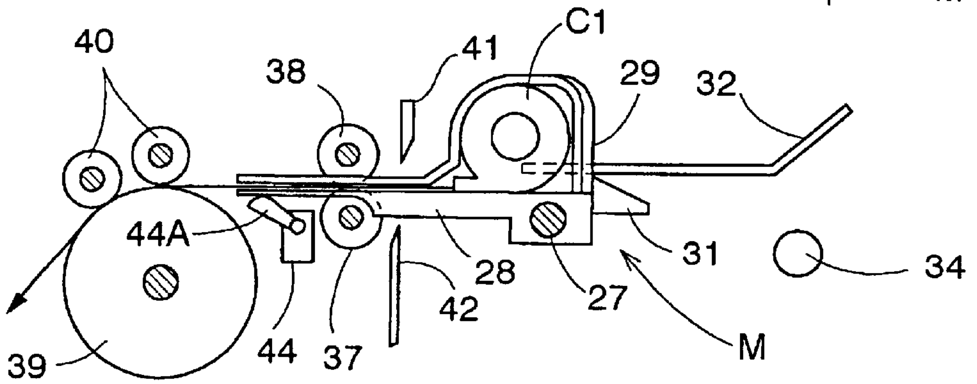
Figure 8C:
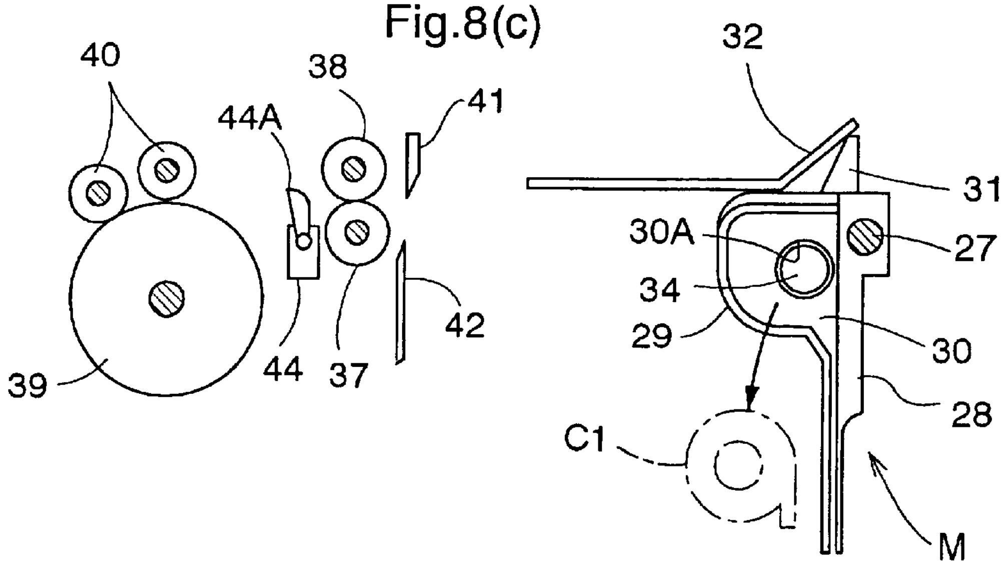

Next, the second transport unit T2 includes a posture change mechanism for changing the posture of film cartridge C1 supported by the handling member M about 90 degrees, so that the film F1 drawn from the film cartridge C1 is directed substantially horizontally. As shown in FIGS. 2 and 4, the posture change mechanism includes a contact piece 31 projecting from the handling member M, and a cam member 32 disposed on the vertical wall of the shift frame 18. The contact piece 31 and cam member 32 constitute a cam mechanism. As shown in FIGS. 8(*a*) and 8(*b*), when the handling member M moves from the transfer position P1 toward the feed position P2, the contact piece 31 of handling member M contacts the cam member 32, whereby the handling member M is rotated 90 degrees. The handling member M is biased by a spring (not shown) to the posture (shown in FIG. 4) having the film F1 directed downward. In the absence of a force from the cam mechanism, the handling member M is maintained in the posture having the drawn film F1 directed downward.

As shown in FIG. 4, a wall member 33 is disposed below the transfer position P1 to extend generally vertically. The wall member 33 defines a discharge path for empty film cartridges C with the films F1 having been drawn out to fall by gravity into the collecting container 2. As shown in FIGS. 2 and 7, the apparatus has a contact rod 34 fixedly mounted therein and extending horizontally. When the shift frame 18 moves to the discharge position EP, this contact rod 34 extends into the holding space of the handling member M through the opening 30A formed in the wall member 30 to push the film cartridge C1 out of the handling member M and allow the cartridge C1 to fall by gravity.

As shown in FIGS. 3 and 4, the main feed mechanism U includes an introduction roller 37 disposed upstream of the first lane L1 with respect to the transport direction, a pressure roller 38 of the free rotation type switchable between a position for pressure contact with the introduction roller 37 and a position separated therefrom, a drive roller 39 disposed downstream with respect to the film transport, two pressure rollers 40 in pressure contact with the drive roller 39, a roller motor 51 for driving the introduction roller 37 and drive roller 39, and actuators 52 such as electromagnetic solenoids (FIG. 2) for switching the pressure rollers 38 and 40 between the pressure contact position and separated position.

As shown in FIG. 2 and FIG. 4, the main feed mechanism U further includes a cutter unit having a fixed blade 41 and a movable blade 42 disposed upstream of the introduction roller 37 with respect to the transport direction, and a cutter motor 43 for reciprocating the movable blade 42. A pair of first existence sensors 44 are disposed between the introduction roller 37 and drive roller 39 for determining presence or absence of film F1 from postures of contact pieces 44A for contacting the film F. The first existence sensors 44 have the respective contact pieces 44A with a spacing therebetween larger than the width of 240-size film F2, and contacting opposite ends transversely of 135-size film F1.

The introduction roller 37 and pressure roller 38 have a width for entering the cutouts 28A and 29A of the handling member M. Thus, the two rollers 37 and 38 can reliably grip the part of 135-size film F1 lying in the cutouts 28A and 29A to feed the film F1. The movable blade 42 has a width for entering the cutting openings 28B and 29B of the handling member M to cut the film F1 reliably through the cutting openings 28B and 29B.

Next, as shown in FIGS. 2 and 3, the auxiliary feed mechanism V includes an introduction roller 46 disposed upstream of the second lane L2 with respect to the transport direction, a pressure roller 47 of the free rotation type switchable between a position for pressure contact with the introduction roller 46 and a position separated therefrom, a drive roller 48 disposed downstream with respect to the film transport, and two pressure rollers 49 (see FIG. 6) in pressure contact with the drive roller 48. The introduction roller 46 is supported coaxially with the introduction roller 37 of main feed mechanism U. The drive roller 48 is supported coaxially with the drive roller 39 of main feed mechanism U. The switching between the pressure contact position and separated position of the pressure roller 47 of auxiliary feed mechanism V is performed by the actuator 52 of main feed mechanism U. A second existence sensor 50 is provided for determining presence or absence of 240-size film F2 from a posture of a single contact piece 50A for contacting the film F2.

As shown in FIGS. 2 and 3, the holder 8 of interrupting feed mechanism W includes a main holder body 8A supported by the shift frame 18 and a holding member 8B attached to the main holder body 8A to be openable and closeable relative thereto. The main holder body 8A is supported to be slidable relative to a guide member 53 fixed to the shift frame 18 to extend in the direction X. The holder 8 is used to hold a film cartridge C1 as pinched between the main holder body 8A and holding member 8B. When the shift frame 18 is placed in the shift position SP, as shown in FIG. 7, the operator may manually switch the holder 8 along the guide member 53 between the first introducing position Q1 opposed to the first lane L1 and the second introducing position Q2 opposed to the second lane L2. When the shift frame 18 is moved to the home position HP, the holder 8 is placed in the retracted position Q3 (a region not obstructive to moving of the handling member M to the feed position P2) separated from the introducing positions Q1 and Q2, regardless of its position on the guide member 53. That is, the retracted position Q3 has a width corresponding to a range of movement of the holder 8 relative to the guide member 53. In order that the holder 8 may be set reliably to the first introducing position Q1 or second introducing position Q2, the holder 8 has a click stop mechanism (not shown) formed between a lower surface of the holder and the guide member 53 and including a ball spring-loaded to a projecting position and a recess for receiving the ball.

With the interrupting feed mechanism W having the above construction, when developing 135-size film F1 of film cartridge C1, the irregular-shaped forward end portion of film F1 is cut off first, and then the film cartridge C1 with the film F1 drawn out by a predetermined length is set to the holder 8. The holder 8 is set to the first introducing position Q1, the second lid member 7 and first lid member 6 are closed, and predetermined interrupt processing instructions are inputted from the keyboard K. Then, the main feed mechanism U feeds the 135-size film F1 of film cartridge C1 to the first lane L1. When developing 240-size film F2 of film cartridge C2, film F2 is unwound from the film cartridge used in photo-taking, and wound into the dedicated film cartridge C2 for development. The film cartridge C2 with the film F2 drawn out by a predetermined length is set to the holder 8. The holder 8 is set to the second introducing position Q2, the second lid member 7 and first lid member 6 are dosed, and predetermined interrupt processing instructions are inputted from the keyboard K. Then, the auxiliary feed mechanism V feeds the 240-size film F2 of film cartridge C2 to the second lane L2.

Figure 9:
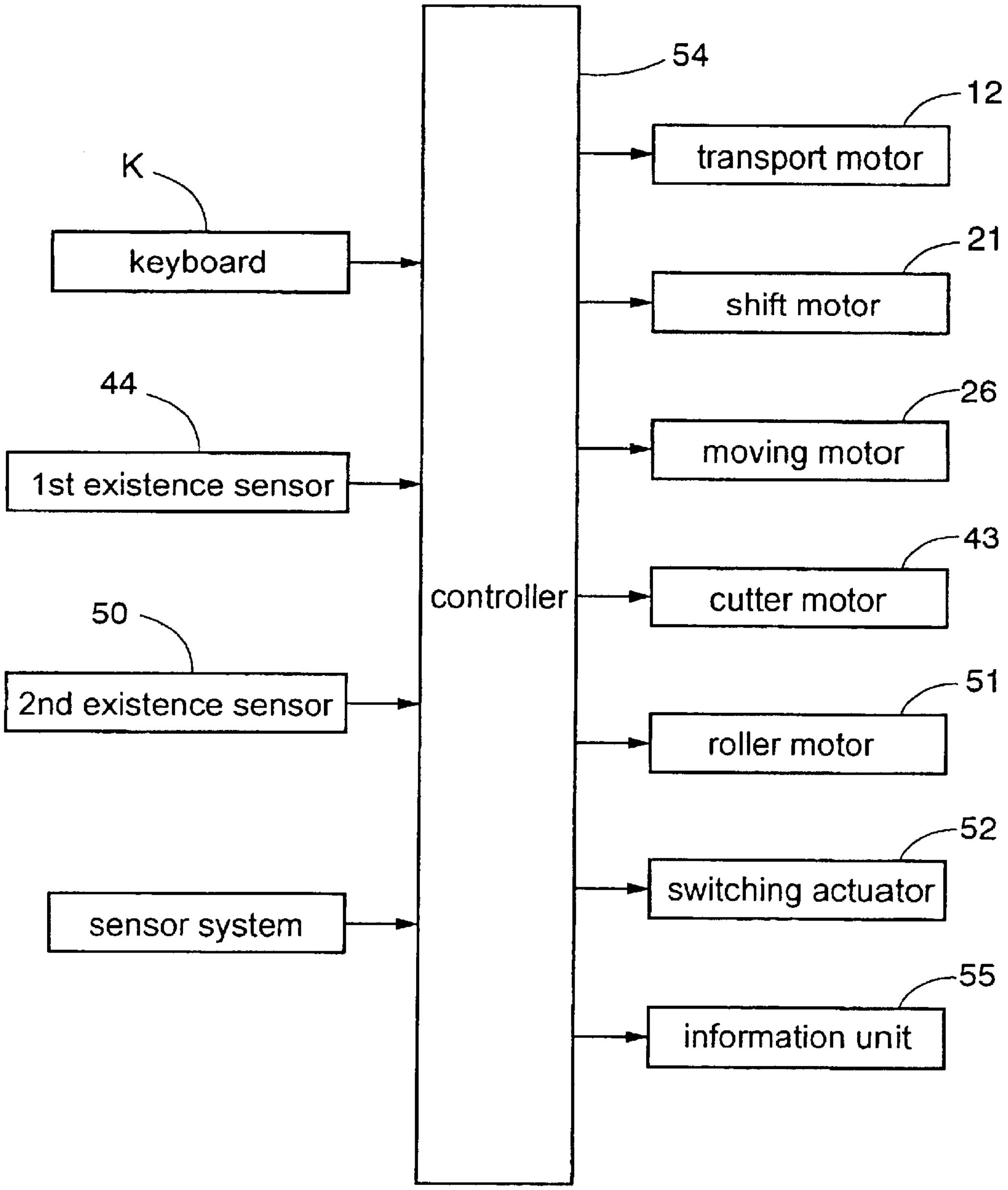
FIG. 9 is a block diagram of a control system.

As shown in FIG. 9, this automatic feeding apparatus SA has a controller 54 acting as a control device including a microprocessor (not shown). The controller 54 has an input system for receiving signals from the keyboard K, first existence sensor 44, second existence sensor 50, and other sensors labeled "sensor system" in FIG. 9 (which includes a sensor for detecting the first lid member 6 in the dosed position, a determining device for determining positions of the shift frame 18, and a determining device for determining positions of the handling member M). The controller 54 outputs control signals to the transport motor 12, shift motor 21, moving motor 26, cutter motor 43, roller motor 51 and switching actuator 52. Further, an information unit 55 in the form of a light emitting diode or liquid crystal display disposed on or adjacent the keyboard K for giving information to the operator based on signals from the controller 54. The controller 54 performs the following controls based on programs set beforehand.

Continuous Processing Mode

The continuous processing mode is a mode of feeding the films F1 of film cartridges C1 supported by the first transport unit T1 to the developing device D. The first lid member 6 and second lid member 7 are opened, and a plurality of (up to three in the illustrated example) film cartridges C1 are set to positions between the support members 13. At the same time, the operator confirms that the holder 8 for use in an interrupt processing mode is in the retracted position Q3, then doses the second lid member 7 and first lid member 6, and inputs predetermined instructions from the keyboard K to start a continuous processing. Then, the continuous processing mode is started. It is also possible to interrupt the continuous processing mode by operating the keyboard K. An indicator lamp (not shown) at a side of the keyboard K may be lit green to indicate that the first lid member 6 and second lid member 7 may be opened safely. The indicator lamp may be lit red when the first lid member 6 and second lid member 7 cannot be opened safely, such as while the films are being drawn from the film cartridges C1. During such time, at least one of the first lid member 6 and second lid member 7 may be locked, for example, by a solenoid mechanism (not shown).

Figure 10:
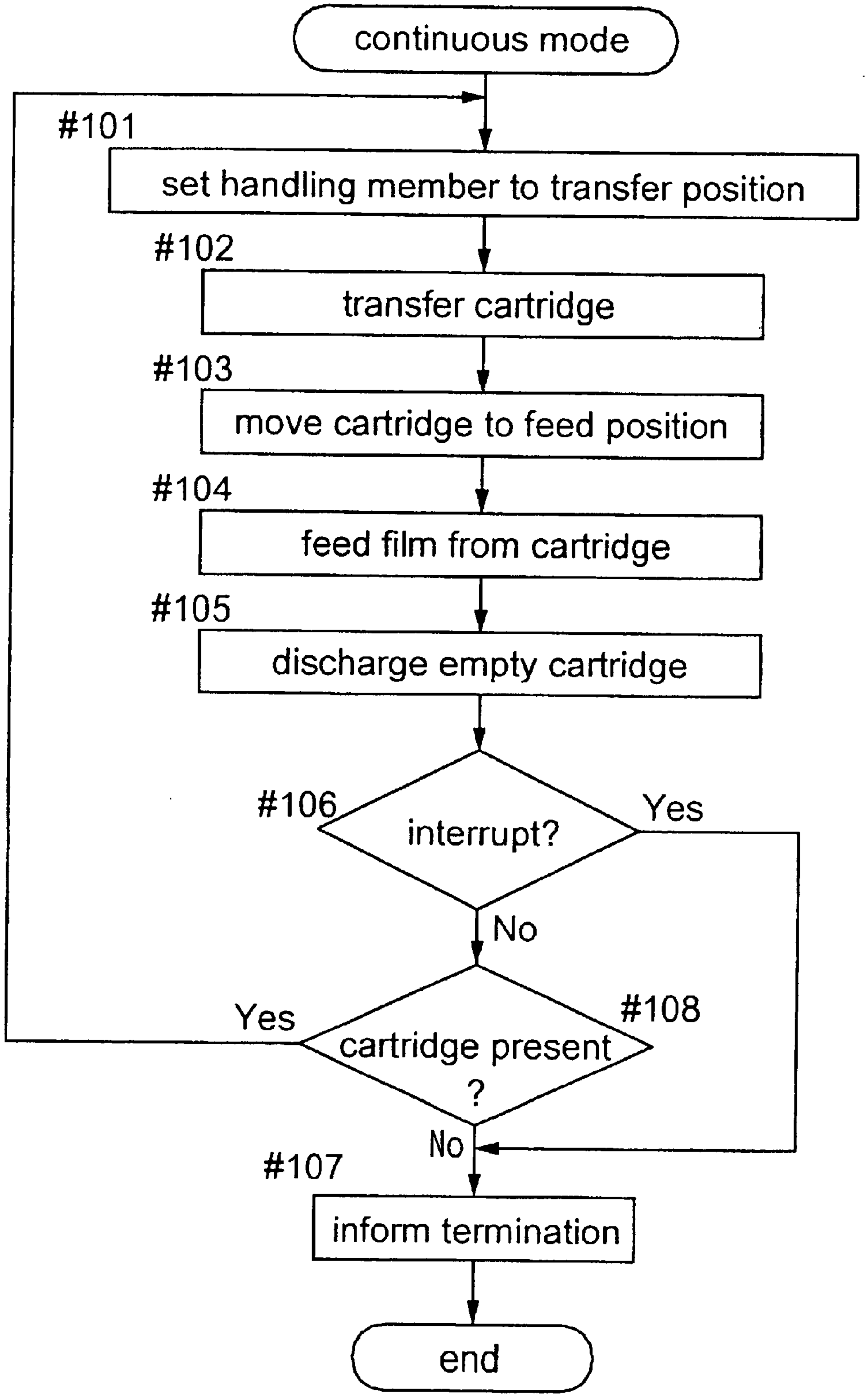
FIG. 10 is a flow chart of a processing sequence in a continuous processing mode.

The flow chart of FIG. 10 shows an outline of the processing sequence automatically executed by the controller 54 in the continuous processing mode. When this control is started, the shift motor 21 is operated as necessary to place the shift frame 18 in home position HP. At the same time, the moving motor 26 is operated as necessary to place the handling member M on standby in the transfer position P1. Next, the transport motor 12 of the first transport unit T1 is operated to transfer a film cartridge C1 to the handling member M standing by in the transfer position P1. After this transfer, the handling member M is transported to the feed position P2 by operating the moving motor 26 of the second transport unit T2. (Steps #101 to #103)

When the film cartridge C1 is transferred to the handling member M standing by in the transfer position P1, the handling member M assumes the posture shown in FIG. 8(*a*). Subsequently, while the handling member M is moved to the feed position P2, the contact piece 31 of the handling member M contacts the cam member 32, thereby changing the handling member M to the posture shown in FIG. 8(*b*).

Next, the pressure roller 38 is switched to the pressure contact position, whereby a forward end portion of the film F1 of the film cartridge C1 supported by the handling member M is pinched between the pressure roller 38 and introduction roller 37. With rotation of the introduction roller 37 and drive roller 39, the film F1 is fed from the film cartridge C1 in the feed position P2 (step #104). In time of starting the feeding of the film F1, the first existence sensors 44 check presence of the film F1. When almost all of the film F1 has been drawn out of the film cartridge C1, the cutter unit cuts the film F1. Almost all of the film F1 having been drawn out of the film cartridge C1 is determined by detecting an increase in the electric current supplied to the introduction roller 37 and drive roller 39. That is, when almost all of the film F1 has been fed from the film cartridge C1, an increased tension acts on the film F1, and at the same time an increased load acts on the introduction roller 37 and drive roller 39. Such increases provide a basis for determining that almost all of the film F1 has been fed. Instead of the increase in the electric current supplied to the introduction roller 37 and drive roller 39, the increase in the tension acting on the film may be detected directly. After cutting the film F1, the first existence sensors 44 detect absence of the film F1. Then, the main feed mechanism U is stopped to end the feeding of film F1.

When the feeding of film F1 from the film cartridge C1 is completed, the empty film cartridge C1 supported by the handling member M is returned to the transfer position P1 by operating the moving motor 26. Next, the shift frame 18 is moved to the discharge position EP by operating the shift motor 21 (to move the handling member M to the discharge position EP). The film cartridge C1 is pushed out of the handling member M by the contact rod 34 to fall by gravity to the discharge path to be collected in the collecting container 2 (step #105). When discharging the empty film cartridge C1 from the handling member M, the handling member M has been returned to, the same posture as the standby posture as shown in FIG. 8(*c*).

Upon completion of one cycle for discharging one empty film cartridge C1 as described above, checking is made whether an instruction has been inputted from the keyboard K to interrupt the processing. When such instruction has been inputted, the processing is ended after giving information to that effect (steps #106 and #107).

When no interrupts instruction has been inputted from the keyboard K, checking is made whether a film cartridge C1 is present in the first transport unit T1. When a film cartridge C1 is found in the first transport unit T1, steps #101 to #104 are repeated. When no film cartridge C1 is found in the first transport unit T1, the processing is ended after giving information to that effect (step #108).

Interrupt Processing Mode

Figure 11:
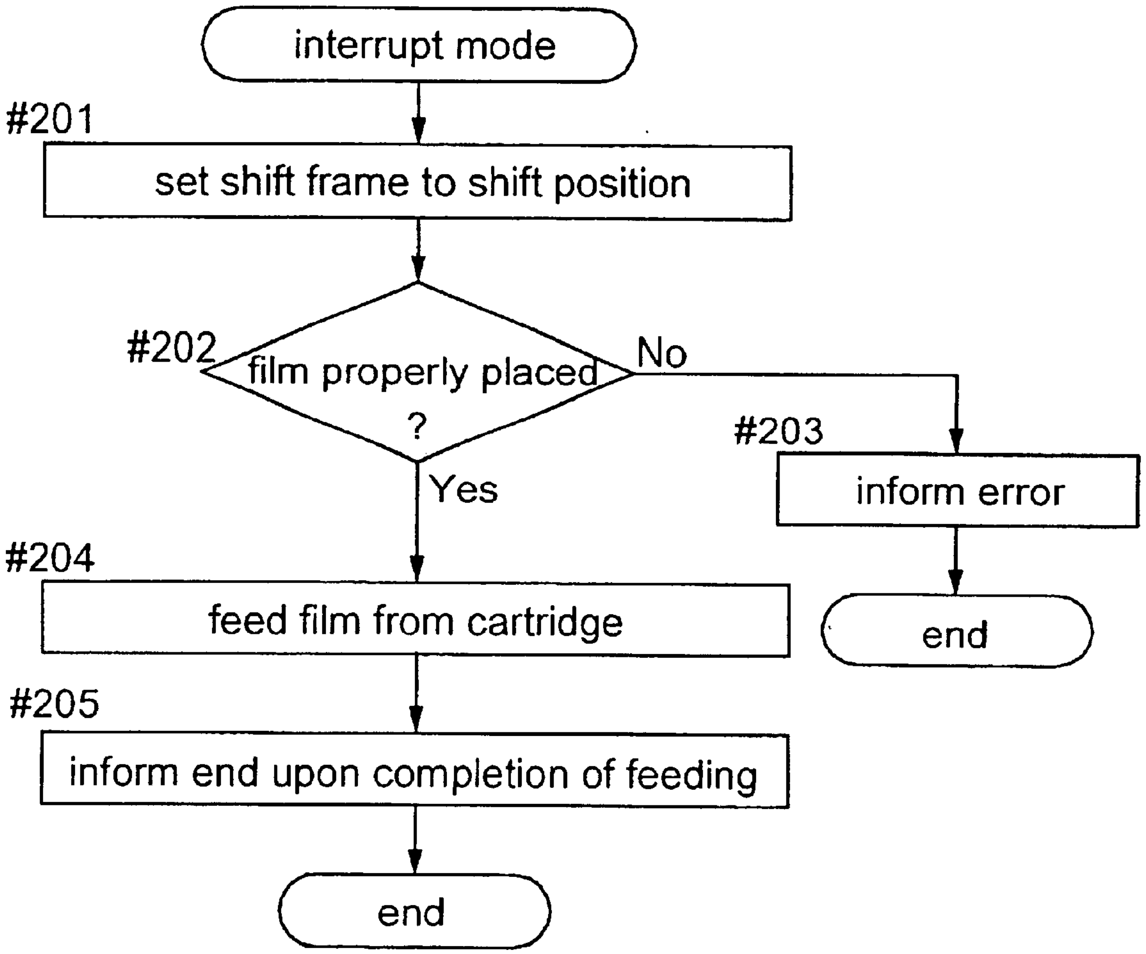
FIG. 11 is a flow chart of a processing sequence in an interrupt processing mode.

The interrupt processing mode is a mode enabled when the processing in the continuous processing mode is interrupted as described above. The flow chart of FIG. 11 shows an outline of the processing sequence in this mode. First, an instruction for "interrupt processing" is given from the keyboard K. Unless the film is being fed from a film cartridge C1 already set between support members 13, and unless the shift frame 18 is in the shift position SP, the shift flame 18 is moved to the shift position by operating the shift motor 21 (step #201). Subsequently, the pressure rollers 38 and 47 are switched to the separated positions. At this point, the indicator lamp is lit green. The operator opens the first lid member 6 and second lid member 7, and sets to the holder 8 a film cartridge C (C1 or C2) with a forward end of film drawn out by a predetermined amount. For a film cartridge C1 for the 135-size, the holder 8 is placed in the first introducing position Q1. For a film cartridge C2 for the 240-size, the holder 8 is placed in the second introducing position Q2. Then, the operator closes the second lid member 7 and first lid member 6, and input predetermined instructions relating to the interrupt processing from the keyboard K. This starts controls in the interrupt processing mode.

Next, the pressure rollers 38 and 47 are switched to the pressure contact positions. The film F1 of film cartridge C1 (or film F2 of film cartridge C2) is thereby pinched between the pressure roller 38 and introduction roller 37 (or pressure roller 47 and introduction roller 46). The film F may be drawn out slightly at this point. The first existence sensors 44 and second existence sensor 50 input signals to the controller 54. The operation is allowed to proceed to a next stage when the film F1 (F2) is detected by the pair of first existence sensors 44 or the second existence sensor 50. When none of the sensors detect film F, or when only one of the first existence sensors 44 detects film F, an error is notified and the processing is terminated (steps #202 and #203).

That is, when a 135-size film F1 is properly set to the first lane L1, the pair of first existence sensors 44 detect the film F1. When a 240-size film F2 is properly set to the second lane L2, the second existence sensor 50 detects the film F2. In either case, the film is determined to be properly set. As noted hereinbefore, the pair of first existence sensors 44 have the two contact pieces 44A with a spacing therebetween larger than the width of 240-size film F2. When a 240-size film F2 is fed to the first lane L1 in error, the two first existence sensors 44 fail to detect the film F. In such a situation, an error is reported.

Next, with the film F1 of film cartridge C1 (or film F2 of film cartridge C2) pinched between the pressure roller 38 and introduction roller 37 (or pressure roller 47 and introduction roller 46), the introduction roller 37 and drive roller 39 (or introduction roller 46 and drive roller 48) are rotated to start feeding the film F1 from the film cartridge C1 (or film F2 from the film cartridge C2) (step #204). When the film F1 is fed to the first lane L1, the same processing is executed as in the continuous processing mode described above, to cut the rear end of film F1, and stop roller motor 51 several seconds after the first existence sensors 44 detect the rear end of film F1. When the film F2 is fed to the second lane L2, the roller motor 51 is stopped several seconds after the second existence sensor 44 detects the rear end of film F2. Then, the feeding of film F1 (or film F2) by the main feed mechanism U or auxiliary feed mechanism V is stopped and an end of the processing is reported (step #205).

In particular, the automatic feeding apparatus according to this invention can feed the developing device D with 126-size film F (that has a width 35 mm equal to the 135-size film) and control strips of 35 mm width also. The 126-size film may be taken out of a 126-size cartridge and taken up into a dedicated film cartridge beforehand Similarly, the control strips may be taken up into a dedicated film cartridge C beforehand. The film cartridge as supported by the holder 8 of interrupting feed mechanism W may be set to the first introducing position Q1 opposed to the first lane L1, and a processing may be started as described hereinbefore.

The automatic feeding apparatus according to this invention is constructed to transport automatically to the feed position P1 a plurality of film cartridges C1 for the 135-size which is relatively frequently developed. This realizes processes requiring a reduced manual operation. Further, the film cartridges C are transported horizontally to reduce vertical dimensions of the apparatus, compared, for example, with an apparatus constructed to transport the film cartridges vertically. As a result, the film processor to which this automatic feeding apparatus is assembled may have reduced vertical dimensions. Moreover, the discharge space for the film cartridges C may easily be formed in a lower position to facilitate collection of empty film cartridges C. With the interrupting feed mechanism W, the feeding of films F1 from film cartridges C1 of the 135-size may be interrupted to feed a film F1 from a particular film cartridge C1 of the 135-size or a film F2 from a film cartridge C2 of 240-size to the developing device D.

This invention is not limited to the above embodiment. For example, three or more lanes may be provided for transporting films F. A modification may be made for automatically feeding films of the 110-size, 120-size or 220-size.

What is claimed is:

1. An automatic photo film feeding apparatus comprising:

a transport mechanism for successively transporting a plurality of film cartridges to a feed position, said transport mechanism including a first transport unit for supporting said film cartridges with photo films drawn downward and successively transporting said film cartridges substantially horizontally to a transfer position, and a second transport unit for receiving said film cartridges transported to the transfer position by said first transport unit, and transporting said film cartridges horizontally to said feed position;

said second transport unit having a posture change mechanism for changing said film cartridges to a posture having said photo films drawn from said film cartridges being directed substantially horizontally; and a feed mechanism for drawing said photo films out of said film cartridges transported to said feed position, and feeding said photo films to a processing section, said feed mechanism having rollers for substantially horizontally drawing said photo films out of said film cartridges transported to said feed position by said second transport unit.

2. An automatic photo film feeding apparatus as defined in claim 1, wherein said first transport unit includes an endless rotating belt wound around wheels juxtaposed sideways, and a plurality of support members arranged on said rotating belt for supporting said film cartridges, and said second transport unit has a handling member for receiving said film cartridges, said handling member being movable between said transfer position and said feed position, and between said transfer position and a discharge position spaced from said first transport unit, and wherein control means is provided for transferring said film cartridges supported by said support members to said handling member in said transfer position based on movement of said endless rotating belt of said first transport unit, moving said handling member supporting one of said film cartridges to said feed position, returning said handling member to said transfer position after drawing out the photo film in said feed position, further moving said handling member from said transfer position to said discharge position, causing said handling member to discharge said one of said film cartridges, and allowing said one of said film cartridges to fall by gravity.

3. An automatic photo film feeding apparatus as defined in claim 2, wherein said handling member defines a space opening toward said first transport unit for receiving said film cartridges from said first transport unit, and a fixed contact rod is provided for contacting said one of said film cartridges supported by said handling member and separating said one of said film cartridges from said handling member when said handling member is moved to said discharge position.

4. An automatic photo film feeding apparatus as defined in claim 2, wherein said handling member is rotatable about a horizontal axis, said posture change mechanism having a cam mechanism for rotating said handling member about said axis when said handling member is moved from said transfer position to said feed position.

5. An automatic photo film feeding apparatus comprising:

a transport mechanism for successively transporting a plurality of film cartridges to a feed position, said transport mechanism supporting said film cartridges with photo films drawn downward and successively transporting said film cartridges to said feed position while changing said film cartridges to a posture having said photo films drawn from said film cartridges being directed substantially horizontally;

a feed mechanism for drawing said photo films out of said film cartridges transported to said feed position; and an interrupting feed mechanism for transporting to said feed position a further film cartridge provided from outside separately from said film cartridges supported by said transport mechanism, said interrupting feed mechanism having a film cartridge supporting holder switchable between an introducing position for placing said further film cartridge in said feed position, and a retracted position separated from said introducing position.

6. An automatic photo film feeding apparatus as defined in claim 5, further comprising an auxiliary feed mechanism juxtaposed with said feed mechanism for receiving a photo film of different width to each photo film receivable by said feed mechanism, said holder of said interrupting feed mechanism being movable to a position opposed to said auxiliary feed mechanism.

7. An automatic photo film feeding apparatus as defined in claim 5, wherein said transport mechanism includes a first transport unit for supporting said film cartridges with photo films drawn downward and successively transporting said film cartridges substantially horizontally to a transfer position, and a second transport unit for receiving said film cartridges transported to the transfer position by said first transport unit, and transporting said film cartridges horizontally to said feed position; and said feed mechanism has rollers for pinching at opposite surfaces of each of said photo films of said film cartridges transported to said feed position by said second transport unit, and rotating to draw said photo films substantially horizontally out of said film cartridges.

8. An automatic photo film feeding apparatus as defined in claim 7, wherein said first transport unit includes an endless rotating belt wound around wheels juxtaposed sideways, and a plurality of support members arranged on said rotating belt for supporting said film cartridges, and said second transport unit has a handling member for receiving said film cartridges, said handling member being movable between said transfer position and said feed position, and between said transfer position and a discharge position spaced from said first transport unit, and wherein control means is provided for transferring said film cartridges supported by said support members to said handling member in said transfer position based on movement of said endless rotating belt of said first transport unit, moving said handling member supporting one of said film cartridges to said feed position, returning said handling member to said transfer position after drawing out the photo film in said feed position, further moving said handling member from said transfer position to said discharge position, causing said handling member to discharge said one of said film cartridges, and allowing said one of said film cartridges to fall by gravity.

9. An automatic photo film feeding apparatus as defined in claim 8, wherein said handling member defines a space opening toward said first transport unit for receiving said film cartridges from said first transport unit, and a fixed contact rod is provided for contacting said one of said film cartridges supported by said handling member and separating said one of said film cartridges from said handling member when said handling member is moved to said discharge position.

10. An automatic photo film feeding apparatus as defined in claim 8, wherein said handling member is rotatable about a horizontal axis, said transport mechanism having a cam mechanism for rotating said handling member about said axis when said handling member is moved from said transfer position to said feed position.

* * * * *